United States Patent
Polyakov et al.

(10) Patent No.: US 10,311,709 B2
(45) Date of Patent: Jun. 4, 2019

(54) EMERGENCY COMMUNICATION SYSTEM AND METHOD

(71) Applicant: Delonaco Limited, Nicosia (CY)

(72) Inventors: Maxym Polyakov, Menlo Park, CA (US); Mykhailo Riabokon, Zaporizhzhia (UA)

(73) Assignee: DELONACO LIMITED, Nicosia (CY)

( * ) Notice: Subject to any disclaimer, the term of this patent is extended or adjusted under 35 U.S.C. 154(b) by 0 days.

(21) Appl. No.: 15/729,788

(22) Filed: Oct. 11, 2017

(65) Prior Publication Data
US 2018/0330600 A1    Nov. 15, 2018

(30) Foreign Application Priority Data
May 10, 2017  (UA) .................................. 201704504

(51) Int. Cl.
*H04M 11/04*    (2006.01)
*G08B 25/14*    (2006.01)
*G08B 25/00*    (2006.01)
*H04W 4/90*     (2018.01)

(52) U.S. Cl.
CPC ........... *G08B 25/14* (2013.01); *G08B 25/004* (2013.01); *G08B 25/006* (2013.01); *H04W 4/90* (2018.02)

(58) Field of Classification Search
None
See application file for complete search history.

(56) References Cited

U.S. PATENT DOCUMENTS

| | | | | |
|---|---|---|---|---|
| 2010/0261448 A1* | 10/2010 | Peters | ..................... | H04W 4/90 |
| | | | | 455/404.1 |
| 2014/0368601 A1* | 12/2014 | deCharms | ............. | H04W 4/021 |
| | | | | 348/14.02 |
| 2015/0111524 A1* | 4/2015 | South | ..................... | H04W 4/22 |
| | | | | 455/404.2 |
| 2016/0214553 A1* | 7/2016 | Benoit | ..................... | H04W 4/22 |
| 2017/0270251 A1* | 9/2017 | Bagan | ..................... | G16H 10/60 |

* cited by examiner

*Primary Examiner* — Suhail Khan
(74) *Attorney, Agent, or Firm* — Georgiy L. Khayet

(57) ABSTRACT

An emergency communication system comprises at least two distributed servers. Each of the servers is an independently functioning device configured to operate cooperatively with another server, store personal data of users, duplicate data, and so forth. The servers are connected to a dispatch center, user devices of users, and personal devices of responders through two or more communications networks. The servers are further configured to implement a method including the steps of: receiving an alert signal initiated by a user during an emergency, determining a geographical location of the user based on the alert signal, identifying an emergency type associated with the user based on the alert signal, selecting at least one responder to address the emergency based at least on the emergency type and the geographical location of the user, and sending an emergency signal, including the geographical location of the user, to the at least one responder.

17 Claims, 10 Drawing Sheets

EMERGENCY COMMUNICATION SYSTEM AND METHOD

CROSS-REFERENCE TO RELATED APPLICATIONS

This application is Continuation-in-Part of Ukrainian utility model patent application serial No. u201704504 filed May 10, 2017, entitled "My Police" issued as Ukrainian utility model serial No. 118003 on Jul. 10, 2017, which is incorporated herein by reference in its entirety for all purposes.

BACKGROUND

Technical Field

This disclosure generally relates to data communication and emergency alerting. More particularly, this disclosure relates to an emergency communication system, "My Police," enabling users to send an alert signal through their user devices, such as smart phones, to request assistance during emergency, receive emergency related information from a dispatch center or emergency responders (police, firefighters, paramedics, and the like), communicate with the dispatch center or responders, and much more.

Description of Related Art

Man-made and natural disasters, emergency situations, health and life dangers are common all over the world. Many countries help people to address emergency through government-operated or privately-owned dispatch centers. For example, in the United States, people can seek help by calling the "9-1-1" telephone system, which connects an individual caller with an operator, who is trained to identify an emergency type and its severity, and direct police, ambulance, or firefighters to the caller's location to resolve the emergency. These types of state-of-the art systems for emergency reporting are not always feasible and reliable as they require an individual caller to establish a telephone call with an operator to verbally explain emergency and its location. In certain emergency scenarios, cellular and telephone communication systems can be down or simply not available for the caller to make a call and seek help. Furthermore, sometimes, such as during an active shooter scenario, an individual may need to call police without speaking with an operator as it may reveal the location of the individual to the shooter and put the caller in danger. In yet other scenarios, the caller may not be able to identify her location. For example, if the caller is involved in a car accident on a highway outside of city limits, the caller may not properly and precisely understand her geographical location, which may delay arrival of police, ambulance, or firefighters. Accordingly, due to these and other disadvantages, the traditional emergency reporting systems may not always be helpful for people to use during an emergency.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

The present disclosure is directed to improving reliability, efficiency, and functionality of emergency reporting and communication systems. Furthermore, the present disclosure is directed to reducing costs of establishing and operating the emergency reporting and communication systems.

According to one aspect of embodiments disclosed herein, an emergency communication system is provided. The system comprises at least two distributed servers, which are operatively connected to one another. Each of the servers is an independently functioning device and configured to: operate cooperatively with another server, store personal data of users, encrypt and decrypt transmitted data, and duplicate data concerning alert signals, the users, and emergencies. Furthermore, each server can be further configured to receive, from a user device, an alert signal initiated by a user during an emergency via a first communications network or a second communications network, determine a geographical location of the user based at least in part on the alert signal, identify an emergency type associated with the user based at least in part on the alert signal, select at least one responder to address the emergency based at least on the emergency type and the geographical location of the user, and send an emergency signal to the at least one responder via a third communications network to report the emergency, with the emergency signal including at least the geographical location of the user.

In certain embodiments, the distributed servers are operatively connected to a plurality of user devices of the users through both the first communications network and the second communications network. The servers or at least one of the user devices is configured to determine whether to use the first communications network or the second communications network for data transmission between the user devices of the users and the servers. The servers are also operatively connected to a plurality of personal devices of responders through a third communications network, which differs from the first communications network and the second communications network. The servers are also operatively connected to a plurality of personal devices of responders through the first communications network and the second communications network.

In some embodiments, the system further comprises a dispatch center operatively coupled to the at least two distributed servers and configured to enable voice transmission between at least one of the users and at least one of operators. The system can also include a plurality of personal devices of responders operatively coupled to the servers and configured to enable voice transmission between at least one of the users and at least one of the responders. The servers are further configured to, based on the emergency type, send a response to the user device, the response including information concerning necessary measures to be taken by the user during the emergency. The servers can be further configured to determine if the alert signal can be sent from the user device to an emergency communication system via the first communications network. If it is determined that the alert signal can be successfully sent from the user device to the emergency communication system via the first communications network, the servers send the alert signal to the emergency communication system via the first communications network. Otherwise, if it is determined that the alert signal cannot be successfully sent from the user device to the emergency communication system via the first communications network, the servers send the alert signal to the emergency communication system via the second communications network, wherein the second communications network differs from the first communications network.

According to one aspect of embodiments disclosed herein, a computer-implemented method for emergency communicating is provided. The example method comprises receiving, from a user device, an alert signal initiated by a user during an emergency via a first communications network or a second communications network, determining a geographical location of the user based at least in part on the alert signal, identifying an emergency type associated with the user based at least in part on the alert signal, selecting at least one responder to address the emergency based at least on the emergency type and the geographical location of the user, and sending an emergency signal to the at least one responder via a third communications network to report the emergency, with the emergency signal including at least the geographical location of the user.

In some embodiments, the method further comprises the step of sending a response to the user device, where the response includes information concerning necessary measures to be taken by the user during the emergency. The alert signal can include one or more of the following: the geographical location of the user, the emergency type or an emergency identification associated with the user, personal information of the user, a photograph of the user, a description of the emergency provided by the user using the user device, and a photograph of the emergency captured by the user using the user device.

In some embodiments, the method further comprises the step of decrypting or decoding the alert signal to retrieve, from the alert signal, the geographical location of the user and the emergency type or an emergency identification associated with the user. In some embodiments, the method further comprises the step of determining if the alert signal can be sent from the user device to an emergency communication system via the first communications network. If it is determined that the alert signal can be successfully sent from the user device to the emergency communication system via the first communications network, the servers send the alert signal to the emergency communication system via the first communications network. Otherwise, if it is determined that the alert signal cannot be successfully sent from the user device to the emergency communication system via the first communications network, the servers send the alert signal to the emergency communication system via the second communications network, wherein the second communications network differs from the first communications network.

In some embodiments, the method further comprises the steps of identifying a geographical location of the at least one responder and transmitting the geographical location of the at least one responder to the user device to enable the user device to display the geographical location of the at least one responder on a digital map. The geographical location of the user can also be determined by a dispatch center. In some embodiments, the method further comprises the step of enabling a personal device of the at least one responder to communicate with the user device of the user through the emergency communication system.

According to one aspect of embodiments disclosed herein, there is provided a non-transitory processor-readable medium having instructions stored thereon. The instructions, when executed by one or more processors, cause the one or more processors to implement the method for emergency communicating, as outlined above.

Additional aspects, objects, advantages, and novel features of the embodiments will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

Figure 1:
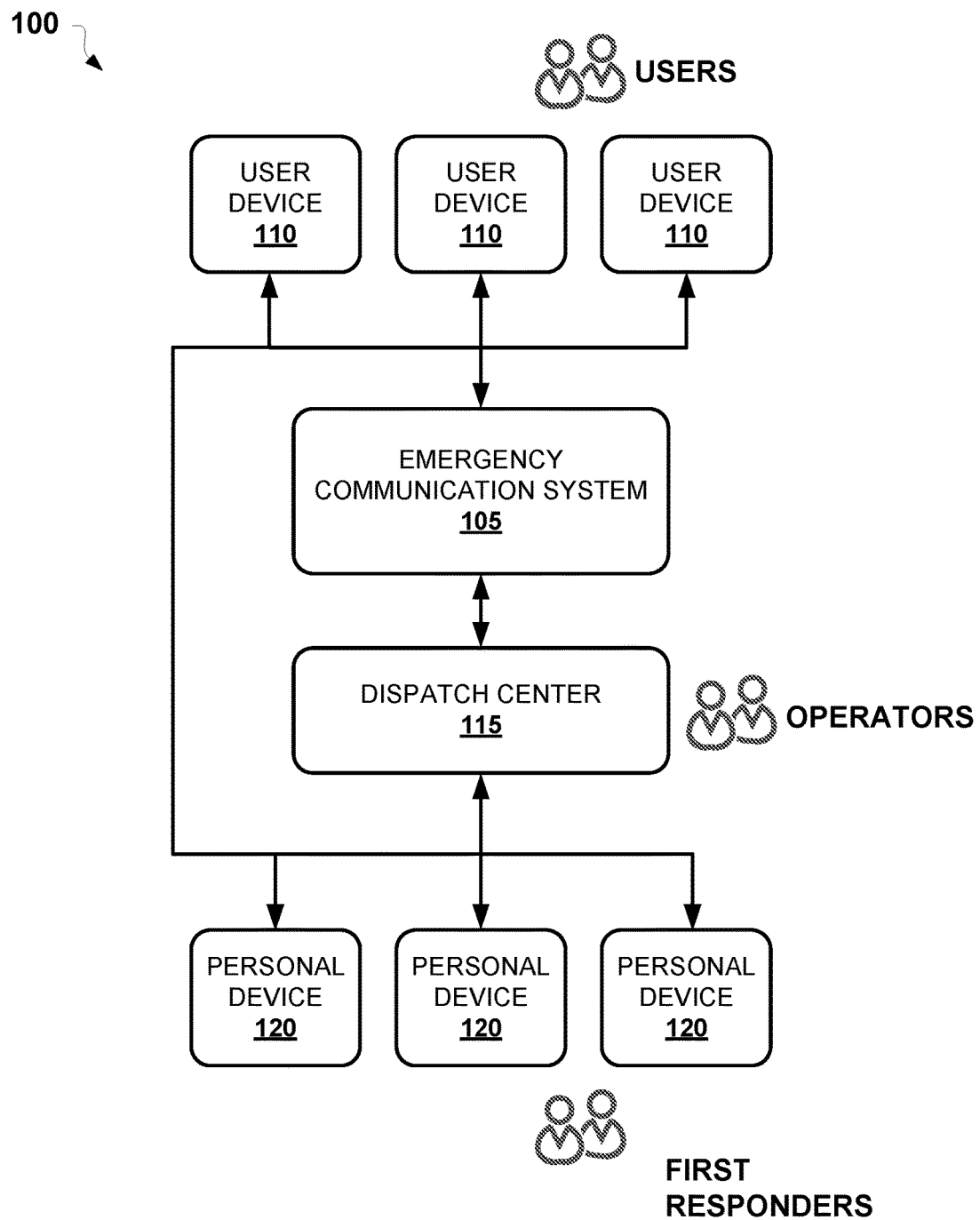
FIG. 1 shows a high-level block diagram of computer and network environment for emergency communication, according to example embodiments.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Aspects of the embodiments will now be presented with reference to a system and methods for emergency communication. These system and methods are described in this section and illustrated in the accompanying drawings by various blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean instructions, instruction sets, code, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more exemplary embodiments, the functions and methods described may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Additionally, it should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

Moreover, it shall be understood that when an element is referred to as being "on" or "connected" or "coupled" to another element, it can be directly on or connected or coupled to the other element or intervening elements can be present.

The terms "user device" and "personal device" may be interchangeable and refer to same or similar devices, where an important distinction is that a user device is operated by a user, while a personal device is operated by a responder. Any or all of the terms "user device" and "personal device" shall mean any portable electronic device with a display or image-projecting device and electronic communication capability. Some examples of user devices and personal devices include, but are not limited to, a mobile device, cellular phone, mobile phone, smart phone, tablet computer, laptop computer, desktop computer, netbook computer, smart watch, personal digital assistant, music player, multimedia player, portable computing device, navigation system, in-vehicle computer, television (TV) device, smart TV, set-top box, cable modem, and so forth.

The term "user" shall be construed to mean an individual who operates a user device and wants to seek help from responders. For example, a user is an individual who experiences or faces an emergency situation, and requires help by a responder.

The term "first responder" (or "responder" for simplicity) shall be construed to mean an individual trained, certified, contracted for, or employed to respond to an emergency and help users involved in the emergency. Some examples of responders include police officers, deputy sheriffs, paramedics, firefighters, ambulance workers, rescuers, private security agents, government agents, army, navy, emergency volunteers, and any other government or private agents or officers who help assist people in case of emergency.

The term "emergency" shall be construed to mean any situation that poses an immediate risk to health, life, property, or environment. Emergencies can be natural or man-made. Some examples of emergencies include, for example, an accident, health condition, natural disaster, crime event (e.g., a murder, terrorist attack, battery, assault, robbery, larceny, arson, and the like).

The term "alert signal" shall be construed to mean a digital message signaling about an emergency transmitted by a user device to an emergency communication system. The alert signal can be generated automatically or manually by a user. For example, a user can generate and send an alert signal, indicating an emergency, by clicking or activating a soft button "SOS" displayable on a screen of a user device (through a proprietary mobile application). The alert signal can include a geographical location of the user or user device, a type of emergency, and possibly also other information, including personal user data, photo, video, voice, audio, text, and so forth.

The present disclosure, as outlined above, refers to an emergency communication system "My Police." This system is a cloud-based solution employing at least two servers, which operate independently from one another but in concert with one another, meaning that they duplicate operations and functionalities to increase system reliability and efficiency. As such, each of the servers is designed to perform the same or substantially same functions as any other server in the system. These functions include receiving, transmitting, and storing data associated with alert signals and any communication between users, operators of a dispatch center, and first responders.

The emergency communication system is operatively connected to a dispatch center, user devices, and personal devices of first responders through three or more distinct communications networks. For example, the user devices can be connected to the emergency communication system via a cellular network and the Internet, while the personal devices of first responders are connected to the emergency communication system through at least a radio network and optionally other networks.

In operation, users have a proprietary mobile or software application installed on their user devices, such as smart phones. The users can create accounts or user profiles with the system to provide certain personal information such as name, address, contact information, photograph, health information (e.g., blood type, certain medical conditions, etc.). In case of an emergency, instead of calling a traditional emergency telephone system, such as the "9-1-1" telephone system, the users operate the application and activate a "SOS" button. An alert signal is then generated and sent to the emergency communication system through one or more communications networks (e.g., a cellular network or Ethernet network).

In some embodiments, the alert signal can be encrypted. For example, the alert signal can include a Hypertext Transfer Protocol over Transport Layer Security (HTTPS) protocol data packet transmitted over a secured data channel. The alert signal can include a variety of information, including, but not limited to, a current geographical location, a type of emergency, and optionally certain personal data of the user (e.g., name, contact information, health history, picture, video, and so forth). The type of emergency can be provided by the user via the mobile application or, alternatively, automatically determined or predicted by the mobile application (e.g., the user device can detect, sense, or otherwise determine fire, crime, flood, health condition, or any other emergency event) through sensors, detectors, information gained from third devices or systems, and the like.

When the alert signal is received, the emergency communication system processes the alert signal and determines the best way to address the emergency. In certain conditions, the emergency communication system can connect the user in the emergency with an operator of the dispatch center, or connect the user with one of first responders or other agents or officers to enable them to speak with one another or chat/text with one another. The emergency communication system can also send a response to the user device, including information concerning necessary measures to be taken by the user during the emergency. The operator of dispatch center can monitor and direct/advise the users or responders. The operator can also communicate with the user and the responders.

Notably, the emergency communication system can automatically determine the current geographical location of the user based on the alert signal. For example, the current geographical location of the user can be retrieved from the alert signal. The user device can determine its current location based on signals obtained from a satellite navigation system such as the Global Positioning System (GPS) or the like. In another example, triangulation methods can be used to calculate the current geographical location of the user. In yet another example, the emergency communication system can remotely request that the user device determine its location and send this information back to the emergency communication system. The emergency communication system can also request a third-party system or device (a navigation system) to supply the current location of the user. Similarly, the emergency communication system can automatically determine the current geographical location of the responders.

Furthermore, the emergency communication system can automatically determine a type of emergency. In one scenario, the type of emergency can be retrieved from the alert signal. In another scenario, the type of emergency can be determined by a natural language engine or machine-learning system based on a user speech. In yet another example, the type of emergency can be determined by an operator of the dispatch center. In yet another example, the type of emergency can be determined by reading sensors or detectors associated with the user or its current location (e.g., by alarm or fire detectors). For example, the type of emergency can be detected by obtaining and processing vital parameters of the user (e.g., heart rate, blood pressure, temperature, etc.). In yet another example, the type of emergency can be determined by obtaining and processing video images of a scene where the user is located (e.g., a crime can be automatically recognized by processing a video captured by a security camera).

The emergency communication system determines the best way to respond and address the emergency of the user based on the current location of the user and the type of emergency. In one example, the emergency communication system can put the user on a line with an operator or responder and enable their verbal communication. In another example, the emergency communication system can send text or multimedia information to the user device as to how to address the emergency in absence of the responders. In yet another example, the emergency communication system can identify certain responders that are closest to the current geographical location of the user and send them to help the user. In another example, the emergency communication system can identify certain responders that are best trained to address certain types of emergencies and send the identified responders to the user to help during the emergency.

The emergency communication system can also host a website enabling the users to create and edit their accounts (user profiles), upload personal information, rank or review responders, rank or review operators, make posts, read news, find locations and directions to first responders' locations (e.g., police stations, hospitals, fire departments, government agencies, etc.), and so forth.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows a high-level block diagram of computer and network environment 100 for emergency communication, according to example embodiments. Computer and network environment 100 includes an emergency communication system 105, one or more user devices 110, a dispatch center 115, and one or more personal devices 120 of first responders (hereinafter "responders" for simplicity).

The above elements are operatively connected to one another via two or more communications networks. Each of the communications networks can refer to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, Long-Term Evolution (LTE) network, packet switching communications network, circuit switching communications network), Bluetooth radio, Ethernet network, an IEEE 802.11-based radio frequency network, a Frame Relay network, Internet Protocol (IP) communications network, radio network, or any other data communication network utilizing physical layers, link layer capability, or network layer to carry data packets, or any combinations of the above-listed data networks. In some embodiments, the communications network includes a corporate network, data center network, service provider network, mobile operator network, or any combinations thereof.

Emergency communication system 105 includes two or more distributed servers operating under "cloud" computing principles. Each server is an independent unit. The servers can be at different locations, powered by different power sources, and may have different components and functionalities. However, the servers operate cooperatively with one another and back up or support each other. Particularly, the servers duplicate any stored information such that any piece of information can be retrieved from any of the servers. As such, when a user supplies any personal information, it is duplicated and stored to each of the servers. Similarly, any alert signal or emergency related information is duplicated and stored to each of the servers.

At least one of the servers hosts an interactive website for the users, where they can create personal profiles (accounts), update their personal information, subscribe to certain paid services, review news, review posts, make posts, review maps, review locations of certain selected responders, get legal information concerning emergency responding and self-help, communicate with operators of dispatch center 115 and responders, and so forth.

Dispatch center 115 includes at least one server or computing device which is operatively connected to emergency communication system 105. Dispatch center 115 provides a graphical user interface (GUI) for the operators enabling them to communicate with the users and the responders, view digital maps, review instructions and scripts for communication with the users, review personal information of the users, review details of alert signals, and so forth. Dispatch center 115 is also designed to establish or facilitate communication between the users and the responders.

User devices 110 are operated by the users (i.e., individuals who face or may face an emergency). A typical user device 110 is a smart phone or cellular phone having a proprietary mobile application (software) installed thereon. The mobile application provides certain GUIs to the users to enable them to create and edit their personal profiles, generate and send alert signals, view maps, view directions, receive and review responses from emergency communication system 105, communicate with the operators and the responders, review legal information and instructions for self-help, capture photos/videos/audio, transmit the photos/videos/audio to emergency communication system 105, and so forth. Some examples of GUIs are shown in the figures and explained below. User devices 110 are connected with emergency communication system 105 via two or more communications networks, such as the Internet and a cellular network. Either user devices 110 or emergency communication system 105 can determine which communications network among a plurality of communications networks to use based on certain criteria, including network availability, network load, network error rates, network data transfer speeds, network reliability, and so forth. User devices 110 can encrypt data before sending to emergency communication system 105. Emergency communication system 105 can decrypt any data received from user devices 110. Similarly, emergency communication system 105 can encrypt data before sending to user devices 110. User devices 110 can decrypt any data received from emergency communication system 105. Data can be encrypted, for example, using HTTPS protocol.

Personal devices 120 are operated by the responders. A typical personal device 120 is a smart phone or laptop. Similar to above, personal devices 120 can have a software application installed thereon that is configured to facilitate communication with the operators and the users, review alert signals, review users' personal information, receive operators' instructions or directions, view maps, view a location of the user, and so forth. Personal devices 120 can encrypt data before sending to emergency communication system 105 or user devices 110. Emergency communication system 105 or user devices 110 can decrypt any data received from personal devices 120. Similarly, emergency communication system 105 can encrypt data before sending to personal devices 120. Personal devices 120 can decrypt any data received from emergency communication system 105. Data can be encrypted, for example, using HTTPS protocol.

Figure 2:
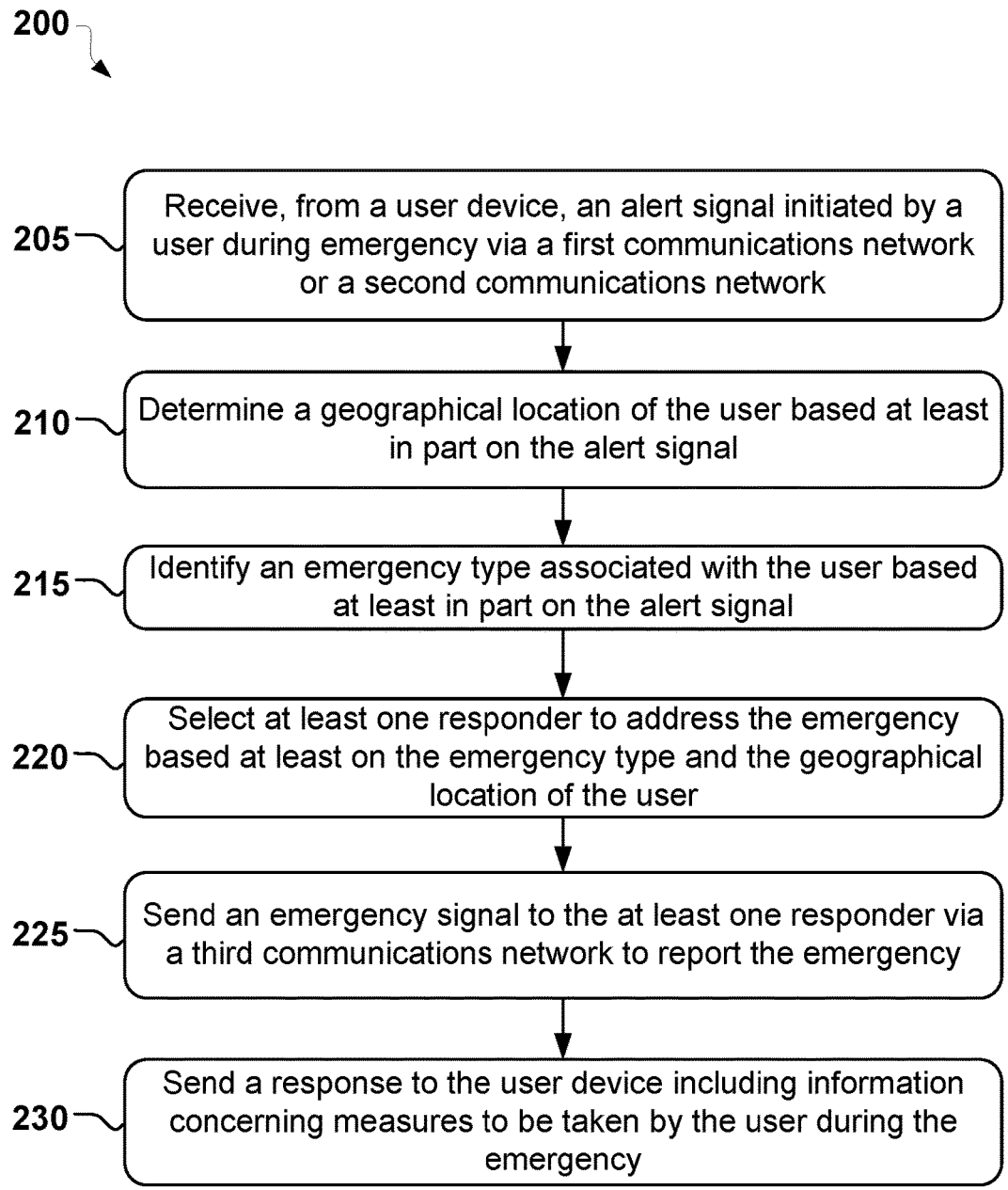
FIG. 2 is a process flow diagram showing a method for emergency communication, according to an example embodiment.

FIG. 2 is a process flow diagram showing a method 200 for emergency communication, according to an example embodiment. Method 200 may be performed by processing logic that may comprise hardware, software, or a combination of both. In one example embodiment, the processing logic refers to emergency communication system 105 or environment 100. Below recited operations of method 200 may be implemented in an order different than described and shown in the figure. Moreover, method 200 may have additional operations not shown herein, but which can be evident for those skilled in the art from the present disclosure. Method 200 may also have fewer operations than outlined below and shown in FIG. 2.

Method 200 commences at step 205 with emergency communication system 105 receiving from a user device 110 an alert signal initiated by a user during an emergency via a first communications network or a second communications network. The alert signal can be generated by the user by actuating a "SOS" button available through a GUI of mobile application installed on user device 110.

The alert signal can include one or more of the following: the geographical location of the user, the emergency type, an emergency identification associated with the user, personal information of the user, a photograph of the user, a description of the emergency provided by the user using user device 110, and a photograph of the emergency captured by the user using user device 110.

In some embodiments, user device 110 or emergency communication system 105 can determine which one of the first communications network or the second communications network is the best for sending the alert signal (for example, based on network availability or network data parameters). Particularly, user device 110 or emergency communication system 105 can determine if the alert signal can be sent from the user device to an emergency communication system via the first communications network. If it is determined that the alert signal can be successfully sent from the user device to the emergency communication system via the first communications network, user device 110 sends the alert signal to emergency communication system 105 via the first communications network. Otherwise, if it is determined that the alert signal cannot be successfully sent from the user device to the emergency communication system via the first communications network, user device 110 sends the alert signal to emergency communication system 105 via the second communications network.

At step 210, emergency communication system 105 determines a geographical location of the user based at least in part on the alert signal.

In some embodiments, emergency communication system 105 may decrypt or decode the alert signal to retrieve from the alert signal the geographical location of the user.

The geographical location of the user can be determined by user device 110, emergency communication system 105, or dispatch center 115 based on satellite navigational system data, triangulation, speech recognition, image processing, sensor data, and so forth.

At step 215, emergency communication system 105 identifies an emergency type associated with the user based at least in part on the alert signal.

In some embodiments, emergency communication system 105 may decrypt or decode the alert signal to retrieve from the alert signal the emergency type or an emergency identification associated with the user.

At step 220, emergency communication system 105 selects at least one responder to address the emergency based at least on the emergency type and the geographical location of the user.

At step 225, emergency communication system 105 sends an emergency signal to at least one responder via a third communications network to report the emergency. The emergency signal includes at least the geographical location of the user.

At step 230, emergency communication system 105 forms and sends a response to the user device. The response is formed or selected based on the emergency type. The response includes information concerning necessary measures to be taken by the user during the emergency ("self-help" information).

Notably, in some embodiments, emergency communication system 105 can also identify a geographical location of the at least one responder and transmit the geographical location of the at least one responder to user device 110 to enable user device 110 to display the geographical location of the responder on a digital map.

Figure 3:
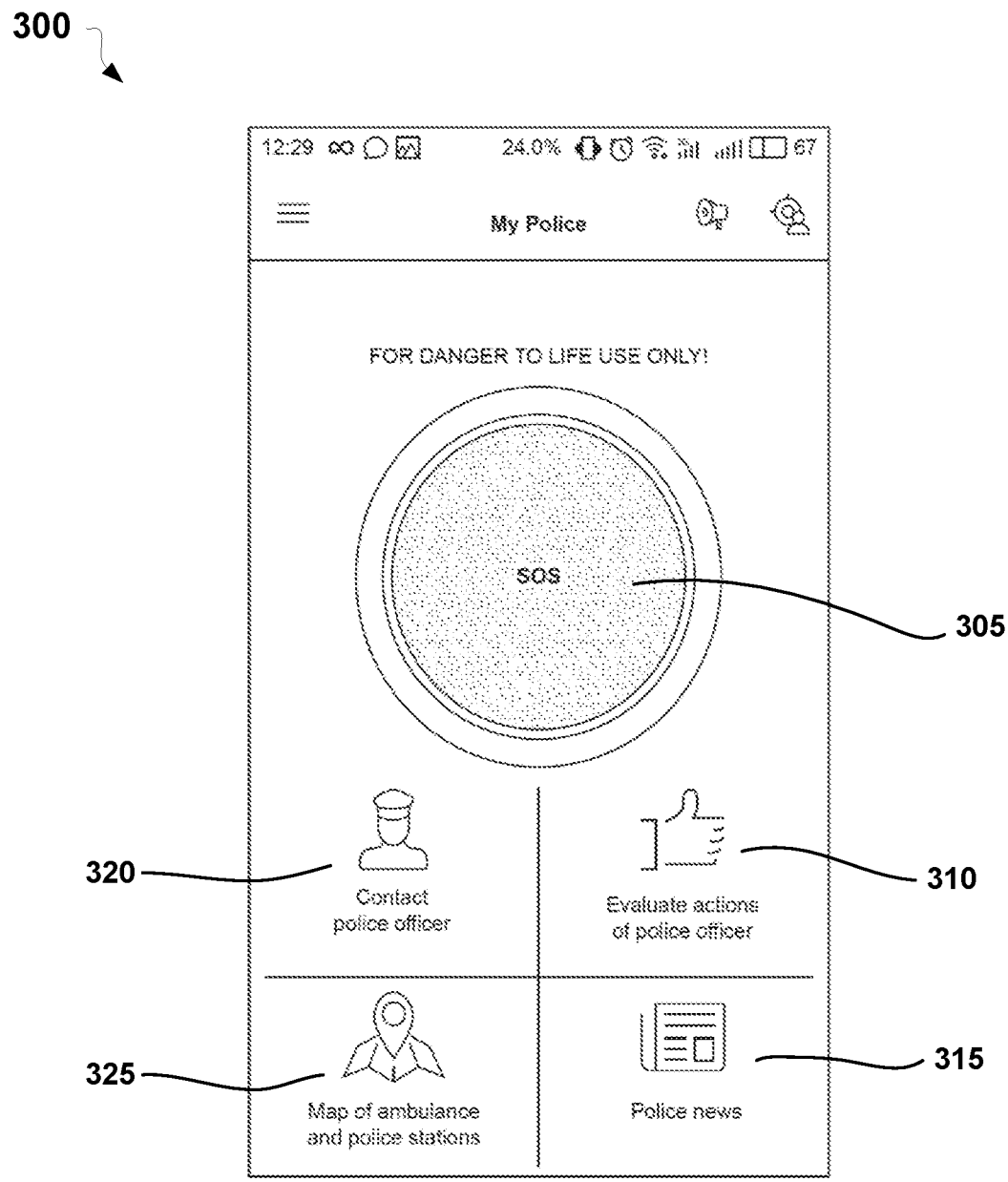
FIG. 3 shows a graphical user interface of a main screen displayable to users through a proprietary mobile application, according to one embodiment.

FIG. 3 shows a graphical user interface 300 of a main screen of the proprietary mobile application, according to one embodiment. Graphical user interface 300 is displayable on a user device 110. Graphical user interface 300 includes an actionable ("soft") button 305 called "SOS," which when activated by a user, causes user device 110 to generate and send an alert signal.

Graphical user interface 300 also includes a button 320 to establish a voice communication with a responder, such as a police officer. Graphical user interface 300 further includes a button 310 to enable the user to review, rank, score, or evaluate actions by a particular responder, such as a police officer. Graphical user interface 300 further includes a button 325 to enable the user to view a digital map showing maps of current geographical locations of certain responders. Graphical user interface 300 further includes a button 315 to enable the user to receive and read news concerning responders or their operations.

Figure 4:
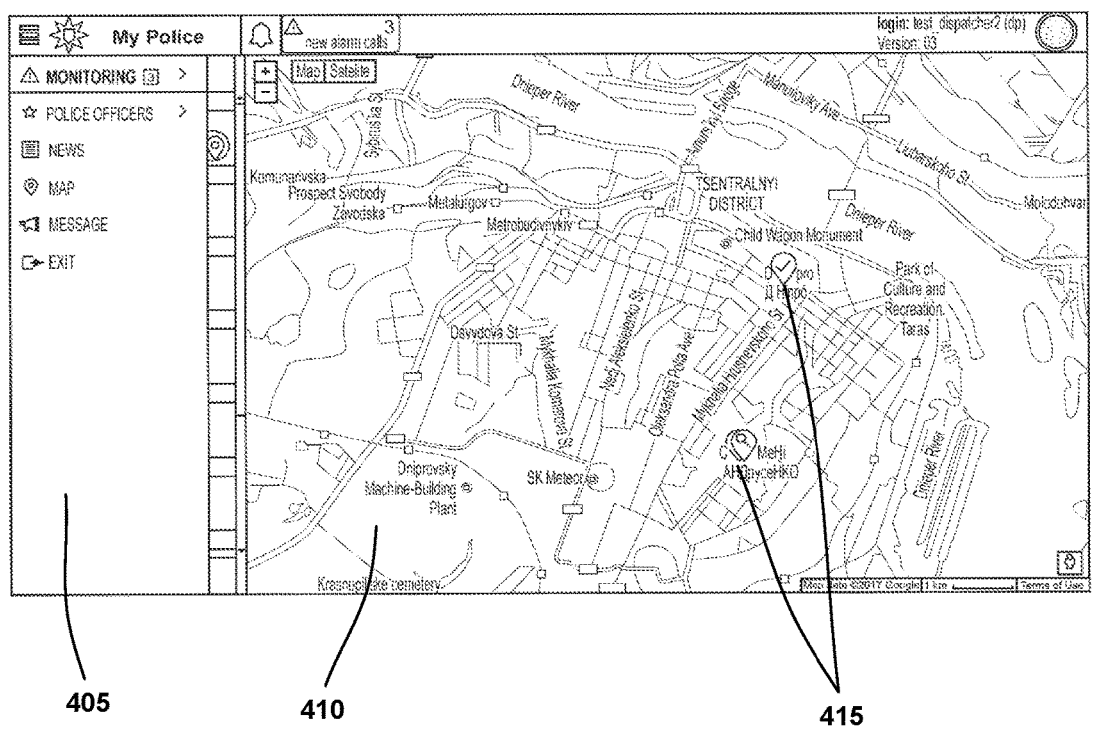
FIG. 4 shows a graphical user interface of a map screen of a proprietary software application displayable to operators of a dispatch center, according to one embodiment.

FIG. 4 shows a graphical user interface 400 of a map screen of the proprietary software application displayable to operators of dispatch center 115, according to one embodiment. Graphical user interface 400 is displayable on a computing device of an operator, which is connected to or a part of dispatch center 115. Graphical user interface 400 includes a plurality of buttons 405 (e.g., a menu) enabling the operators to view locations of responders, establish a communication (voice, video, or text) with the responders, read news, review a digital map, send messages, and the like. Graphical user interface 400 also includes the digital map 410 which has markings 415. Markings 415 can pin point current geographical locations of certain users, responders, government agencies, hospitals, and the like.

Figure 5:
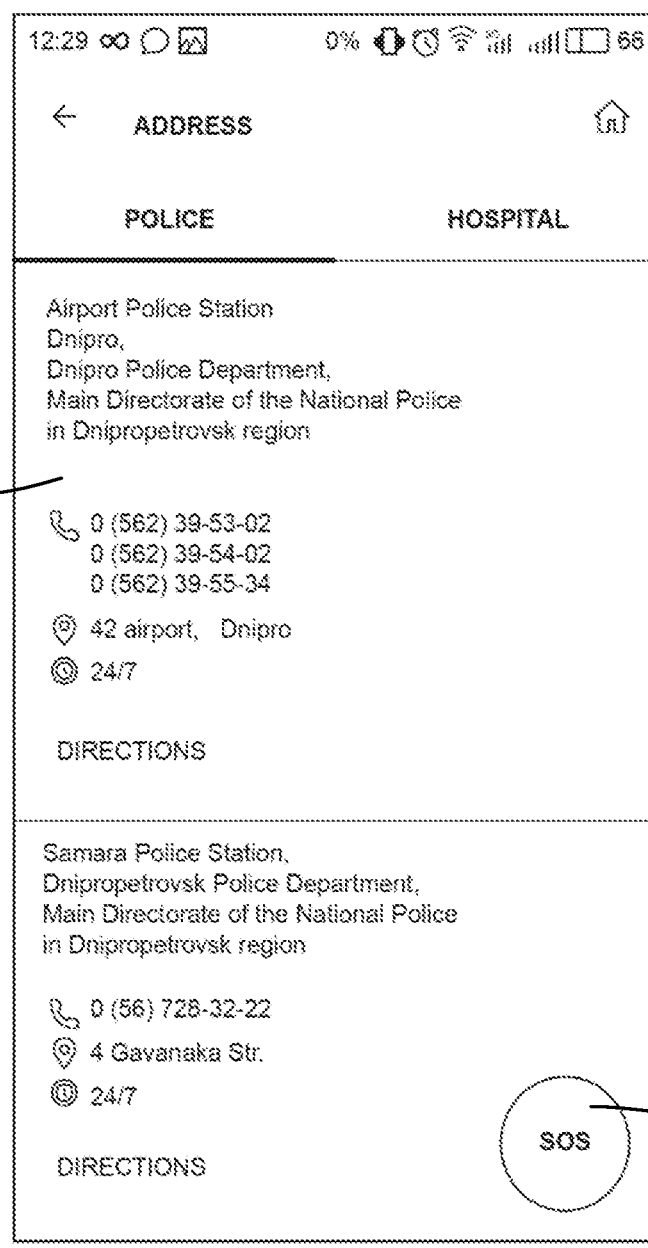
FIG. 5 shows a graphical user interface of a personal information screen displayable to users through the proprietary mobile application, according to one embodiment.

FIG. 5 shows a graphical user interface 500 of a responder information screen displayable to the users through the proprietary mobile application, according to one embodiment. Graphical user interface 500 is displayable on user device 110. Graphical user interface 500 includes a text field 505 enabling the user to review information concerning a selected responder (e.g., a police station). The user can select one of the responders on a digital map. Graphical user interface 500 also includes "SOS" button 305, which enables the users to generate and send an alert signal.

Figure 6:
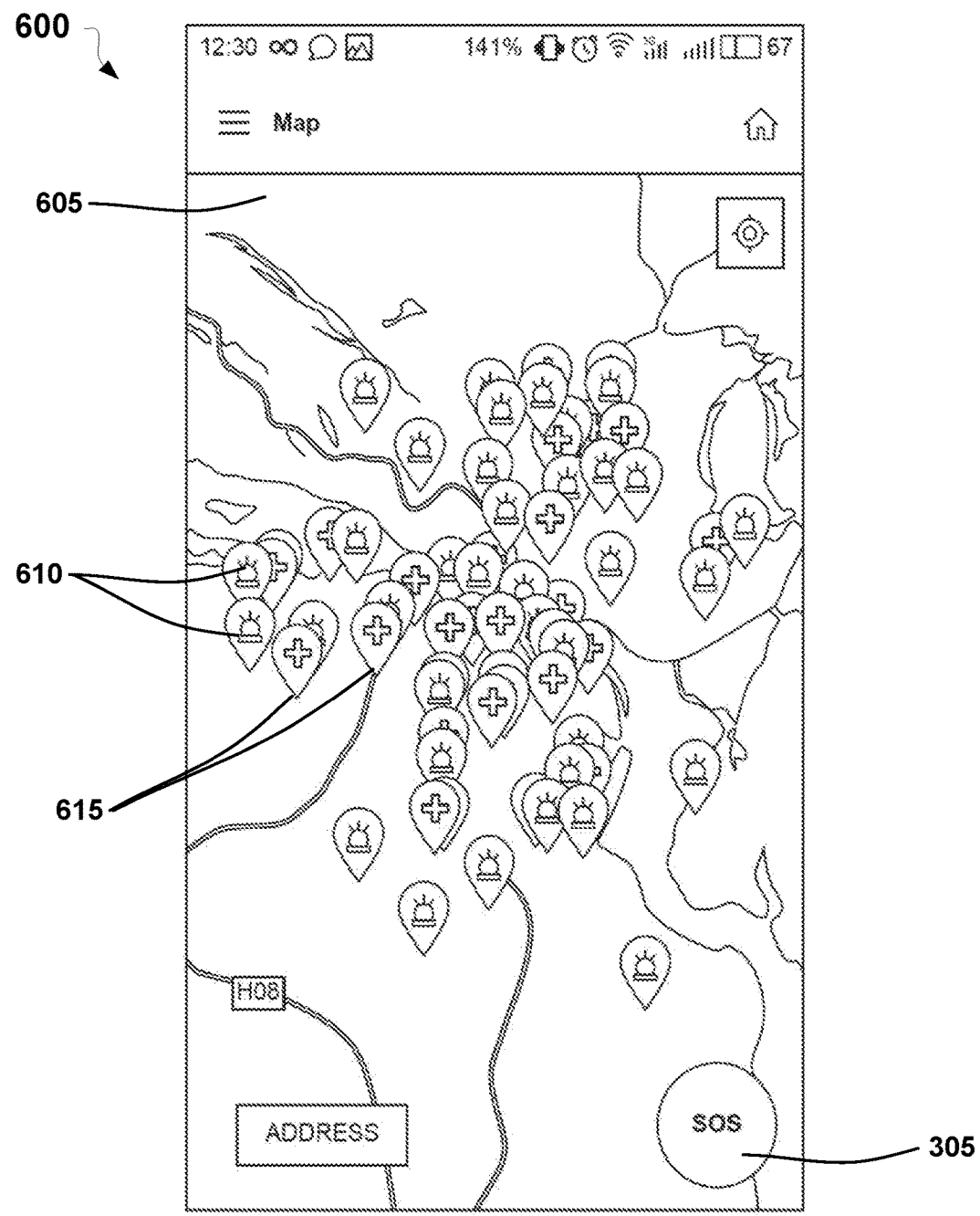
FIG. 6 shows a graphical user interface of a map screen displayable to the users through the proprietary mobile application, according to one embodiment.

FIG. 6 shows a graphical user interface 600 of a map screen displayable to the users through the proprietary mobile application, according to one embodiment. Graphical user interface 600 is displayable on user device 110. Graphical user interface 600 includes a digital map 605 having markings (legends) 610 and 615. Markings 610 can designate current locations of a first type of responders (e.g., police officers or police departments). Markings 615 can designate current locations of a second type of responders (e.g., paramedics or hospitals). Similar to above, graphical user interface 500 also includes "SOS" button 305, which enables the users to generate and send an alert signal.

Figure 7:
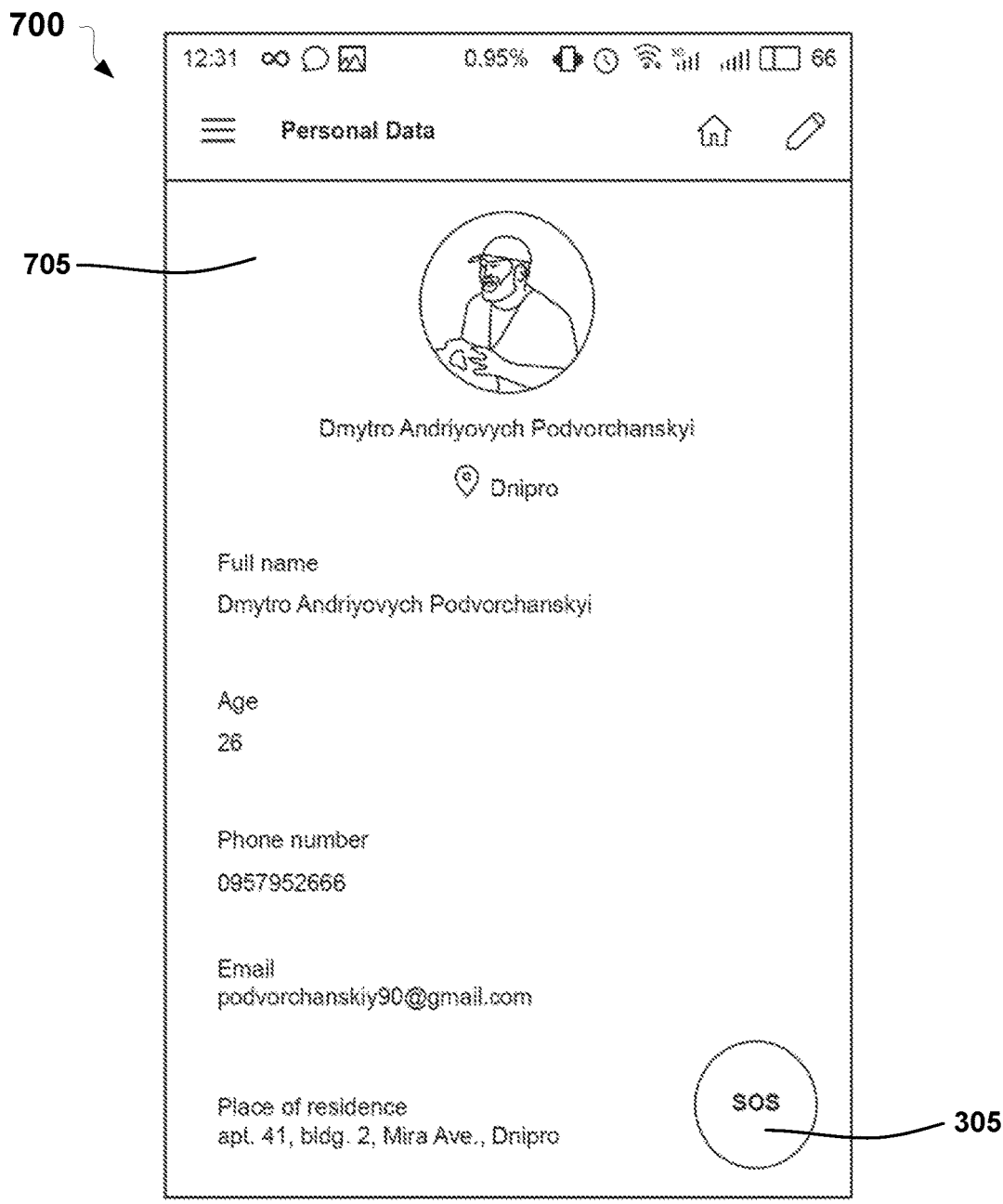
FIG. 7 shows a graphical user interface of a personal information screen displayable to the users through the proprietary mobile application, according to one embodiment.

FIG. 7 shows a graphical user interface 700 of a personal information screen displayable to the users through the proprietary mobile application, according to one embodiment. Graphical user interface 700 is displayable on user device 110. Graphical user interface 700 includes fields 705 enabling the user to provide their personal information. Graphical user interface 700 also includes "SOS" button 305, which enables the users to generate and send an alert signal.

Figure 8:
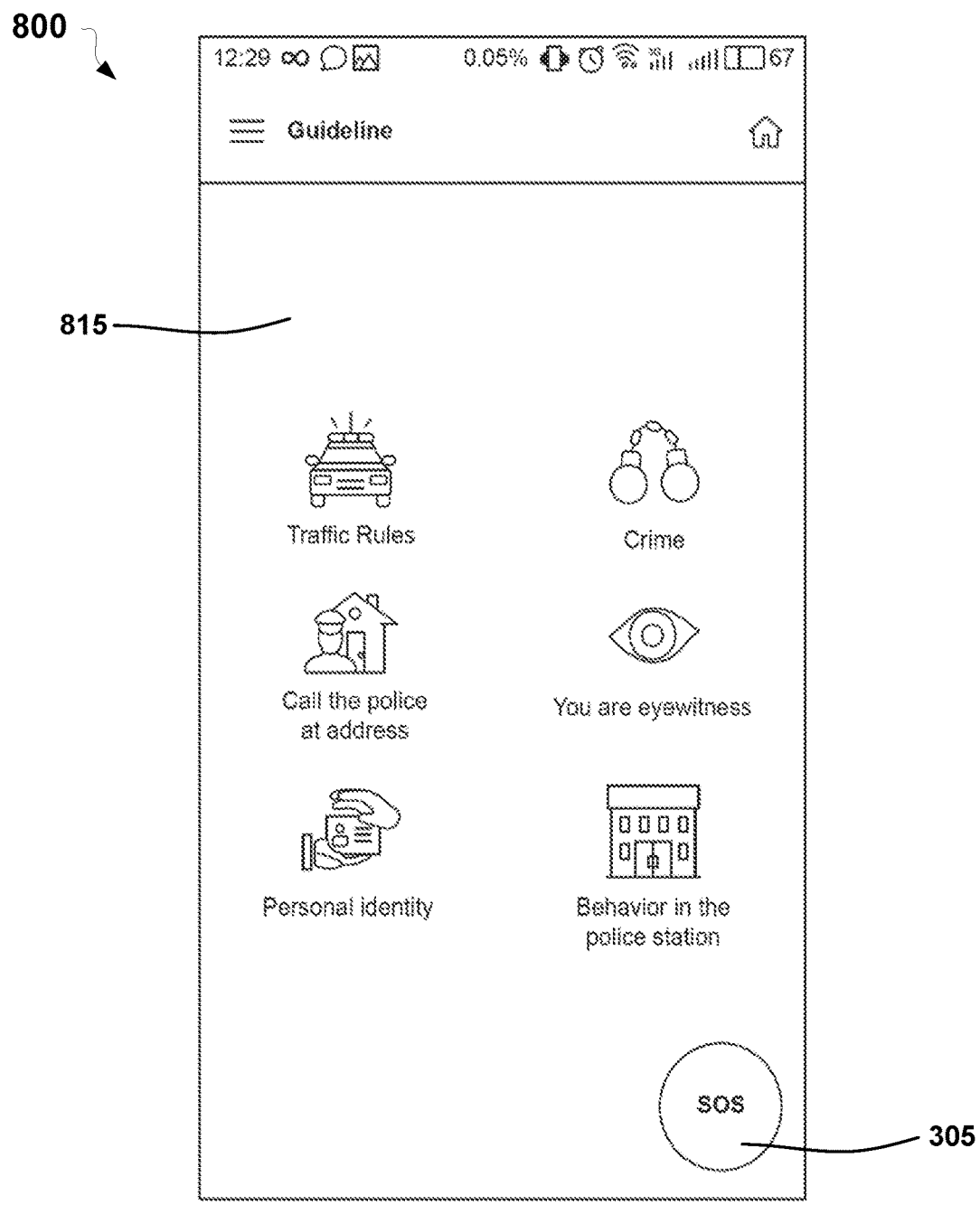
FIG. 8 shows a graphical user interface of a guideline screen displayable to the users through the proprietary mobile application, according to one embodiment.

FIG. 8 shows a graphical user interface 800 of a guideline screen displayable to the users through the proprietary mobile application, according to one embodiment. Graphical user interface 800 is displayable on user device 110. Graphical user interface 800 includes buttons 815 enabling the user to read traffic rules or crime information, establish a call with a police officer at a certain address, report a crime that was witnessed by the user, read personal identity information, report inappropriate behavior of responders, and the like. Graphical user interface 800 also includes "SOS" button 305, which enables the users to generate and send an alert signal.

Figure 9:
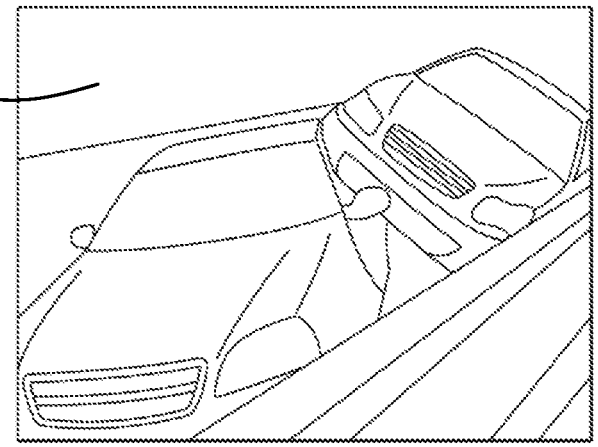
FIG. 9 shows a graphical user interface of an information screen displayable to the users through the proprietary mobile application, according to one embodiment.

FIG. 9 shows a graphical user interface 900 of an information screen displayable to the users through the proprietary mobile application, according to one embodiment. Graphical user interface 900 is displayable on user device 110. Graphical user interface 900 includes image 905 and text field 910 enabling the user to read instructions for self-help during emergency. Graphical user interface 900 also includes "SOS" button 305, which enables the users to generate and send an alert signal.

Figure 10:
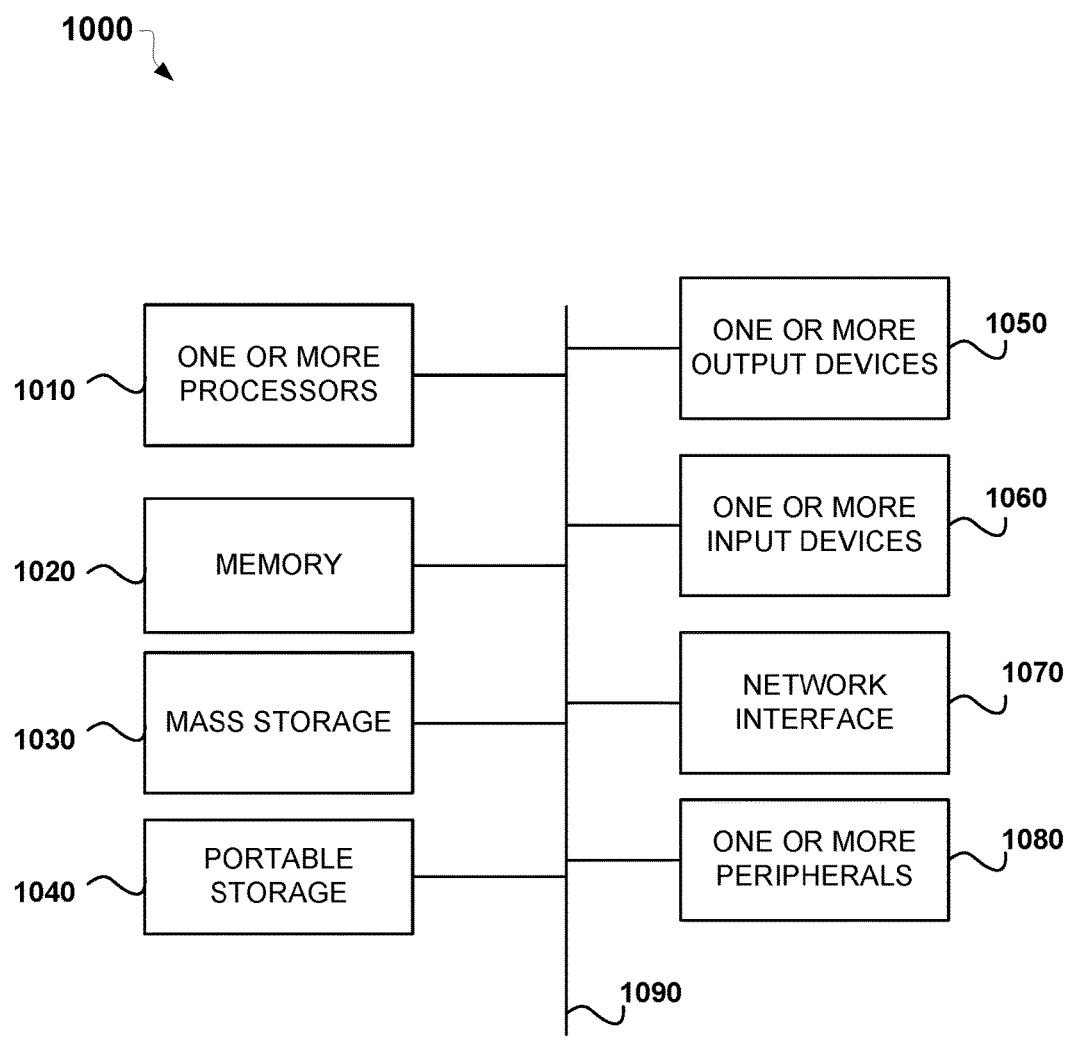
FIG. 10 is a computer system that may be used to implement the methods for emergency communication as described herein.

FIG. 10 is a high-level block diagram illustrating an example computing device 1000 suitable for implementing the methods described herein. In particular, computing device 1000 may refer to an instance of emergency communication system 105, user device 110, dispatch center 115, and personal device 120. Computing device 1000 may include, be, or be an integral part of one or more of a variety of types of devices, such as a general-purpose computer, desktop computer, laptop computer, tablet computer, netbook, mobile phone, smartphone, vehicle computer, security device, surveillance device, smart television device, and so forth. Furthermore, computing system 1000 may be an integrated part of another multi-component system such as a vehicle monitoring system. Notably, FIG. 10 illustrates just one example of computing system 1000 and in some embodiments, computing system 1000 may have fewer elements/modules than shown on FIG. 10 or more elements/modules than shown on FIG. 10.

As shown in FIG. 10, computer system 1000 includes one or more processors 1010 and main memory 1020. Main memory 1020 stores, in part, instructions and data for execution by processor 1010. Main memory 1020 stores the executable code when in operation, in this example. Computer system 1000 further includes a mass data storage 1030, portable storage device 1040, output devices 1050, user input devices 1060, a graphics display system 1070, and peripheral devices 1080.

The components shown in FIG. 10 are depicted as being connected via a single bus 1090. The components may be connected through one or more data transport means. Processor unit 1010 and main memory 1020 are connected via a local microprocessor bus, and mass data storage 1030, peripheral device(s) 1080, portable storage device 1040, and graphics display system 1070 are connected via one or more input/output (I/O) buses.

Mass data storage 1030, which can be implemented with a magnetic disk drive, solid state drive, or an optical disk drive, is a non-volatile storage device for storing data and instructions for use by processor 1010. Mass data storage 1030 stores the system software for implementing embodiments of the present disclosure for purposes of loading that software into main memory 1020.

Portable storage device 1040 operates in conjunction with a portable non-volatile storage medium, such as a flash drive, floppy disk, compact disk, digital video disc, or Universal Serial Bus (USB) storage device, to input and output data and code to and from computer system 1000. The system software for implementing embodiments of the present disclosure is stored on such a portable medium and input to computer system 1000 via portable storage device 1040.

User input devices 1060 can provide a portion of a user interface. User input devices 1060 may include one or more microphones, an alphanumeric keypad, such as a keyboard, for inputting alphanumeric and other information, or a pointing device, such as a mouse, trackball, stylus, or cursor direction keys. User input devices 1060 can also include a touchscreen. Additionally, computer system 1000 includes output devices 1050. Suitable output devices 1050 include speakers, printers, network interfaces, and monitors.

Graphics display system 1070 include a liquid crystal display (LCD) or other suitable display device. Graphics display system 1070 is configurable to receive textual and graphical information and process the information for output to the display device. Peripheral devices 1080 may include any type of computer support device to add additional functionality to the computer system.

The components provided in computer system 1000 are those typically found in computer systems that may be suitable for use with embodiments of the present disclosure and are intended to represent a broad category of such computer components that are well known in the art. Thus, computer system 1000 can be a personal computer (PC), hand held computer system, telephone, mobile computer system, workstation, tablet computer, mobile phone, server, minicomputer, mainframe computer, wearable computer, or any other computing system. The computer may also include different bus configurations, networked platforms, multi-processor platforms, and the like.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, computing system 1000 may be implemented as a cloud-based computing environment, such as a virtual machine operating within a computing cloud. In other embodiments, computing system 1000 may itself include a cloud-based computing environment, where the functionalities of the computing system 1000 are executed in a distributed fashion. Thus, computing system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as computing device 1000, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. An emergency communication system comprising at least two distributed servers, wherein the at least two distributed servers are operatively connected to one another, and each of the at least two distributed servers is an independently functioning device and configured to: operate cooperatively with another server of at least two distributed servers, store personal data of users, encrypt and decrypt transmitted data, duplicate data concerning alert signals, the users, and emergencies such that each of the at least two distributed servers is configured to store a duplicate of the data concerning the alert signals, the users, and the emergencies, wherein any piece of the data concerning the alert signals, the users, and the emergencies is retrievable from any of the at least two distributed servers, wherein the each of the at least two distributed servers is further configured to:

receive from a user device an alert signal initiated by a user during an emergency via a first communications network or a second communications network, wherein the user device is configured to perform detecting, by one or more sensors of the user device, the emergency in proximity to the user and sensing, by the one or more sensors of the user device, a health condition associated with the user, the alert signal including data related to the detecting and the sensing, wherein the data related to the sensing include at least vital parameters of the user;

determine a geographical location of the user based at least in part on the alert signal;

receive an emergency type from the user device, the user device automatically identifying the emergency type associated with the user by processing the data related to the detecting, the vital parameters of the user, and information gained from third parties;

upon receiving the alert signal and determining the geographical location of the user, collect data from one or more sensors located in proximity to the geographical location of the user, the one or more sensors located in proximity to the geographical location of the user including at least one or more cameras located in proximity to the geographical location of the user;

address the emergency of the user based at least on the emergency type, the geographical location of the user, and the data collected from the one or more sensors located in proximity to the geographical location of the user;

wherein one way to address the emergency in accordance with the emergency type and the geographical location is to select at least one responder to address the emergency based at least on the emergency type and the geographical location of the user, and send an emergency signal to the at least one responder via a third communications network to report the emergency, the emergency signal including at least the geographical location of the user;

wherein another way to address the emergency in accordance with the emergency type and the geographical location is to send a response to the user device, the response including information concerning necessary measures to be taken by the user during the emergency; and wherein yet another way to address the emergency in accordance with the emergency type and the geographical location is to establish a two-way voice call between the user and the at least one responder.

2. The system of claim 1, wherein the at least two distributed servers are operatively connected to a plurality of user devices of the users through both the first communications network and the second communications network, wherein at least one of the at least two distributed servers or at least one of the plurality of user devices is configured to determine whether to use the first communications network or the second communications network for data transmission between the user devices of the users and the at least two distributed servers.

3. The system of claim 1, wherein the at least two distributed servers are operatively connected to a plurality of personal devices of responders through the third communications network, wherein the third communications network differs from the first communications network and the second communications network.

4. The system of claim 1, wherein the at least two distributed servers are operatively connected to a plurality of personal devices of responders through the first communications network and the second communications network.

5. The system of claim 1, further comprising a dispatch center operatively coupled to the at least two distributed servers and configured to enable voice transmission between at least one of the users and at least one of operators.

6. The system of claim 1, further comprising a plurality of personal devices of responders operatively coupled to the at least two distributed servers and configured to enable voice transmission between at least one of the users and at least one of the responders.

7. The system of claim 1, the at least two distributed servers are further configured to:

determine if the alert signal can be sent from the user device to an emergency communication system via the first communications network;

if it is determined that the alert signal can be successfully sent from the user device to the emergency communication system via the first communications network, send the alert signal to the emergency communication system via the first communications network;

otherwise, if it is determined that the alert signal cannot be successfully sent from the user device to the emergency communication system via the first communications network, send the alert signal to the emergency communication system via the second communications network via the second communications network, wherein the second communications network differs from the first communications network.

8. A computer-implemented method for emergency communicating, the method comprising:
receiving, by at least one of at least two distributed servers, from a user device an alert signal initiated by a user during an emergency via a first communications network or a second communications network, wherein the user device is configured to perform detecting, by one or more sensors of the user device, the emergency in proximity to the user and sensing, by the one or more sensors of the user device, a health condition associated with the user, the alert signal including data related to the detecting and the sensing, wherein the data related to the sensing include at least vital parameters of the user, and wherein data concerning the alert signal, the users, and the emergencies is stored to each of the at least two distributed servers, wherein any piece of the data concerning the alert signals, the users, and the emergencies is retrievable from any of the at least two distributed servers;
determining, by at least one of the at least two distributed servers, a geographical location of the user based at least in part on the alert signal;
automatically identifying, by the user device, an emergency type associated with the user by processing the data related to the detecting, the vital parameters of the user, and information gained from third parties and providing the emergency type to at least one of the at least two distributed servers;
upon receiving the alert signal and determining the geographical location of the user, collecting, by the least one of the at least two distributed servers, data from one or more sensors located in proximity to the geographical location of the user, the one or more sensors located in proximity to the geographical location of the user including at least one or more cameras located in proximity of the geographical location of the user;
addressing, by at least one of the at least two distributed servers, the emergency of the user based at least on the emergency type, the geographical location of the user, and the data collected from the one or more sensors located in proximity of the geographical location of the user;
wherein one way to address the emergency in accordance with the emergency type and the geographical location includes selecting, by at least one of the at least two distributed servers, at least one responder to address the emergency based at least on the emergency type and the geographical location of the user, and sending an emergency signal to the at least one responder via a third communications network to report the emergency, the emergency signal including at least the geographical location of the user;
wherein another way to address the emergency in accordance with the emergency type and the geographical location includes sending, by at least one of the at least two distributed servers, a response to the user device, the response including information concerning necessary measures to be taken by the user during the emergency; and
wherein yet another way to address the emergency in accordance with the emergency type and the geographical location includes establishing, by at least one of the at least two distributed servers, a two-way voice call between the user and the at least one responder.

9. The method of claim 8, wherein the alert signal includes the geographical location of the user.

10. The method of claim 8, wherein the alert signal includes the emergency type or an emergency identification associated with the user.

11. The method of claim 8, wherein the alert signal includes personal information of the user and a photograph of the user.

12. The method of claim 8, wherein the alert signal includes a description of the emergency provided by the user using the user device and a photograph of the emergency captured by the user using the user device.

13. The method of claim 8, further comprising:
decrypting or decoding the alert signal to retrieve from the alert signal the geographical location of the user and the emergency type or an emergency identification associated with the user.

14. The method of claim 8, further comprising:
determining if the alert signal can be sent from the user device to an emergency communication system via the first communications network;
if it is determined that the alert signal can be successfully sent from the user device to the emergency communication system via the first communications network, sending the alert signal to the emergency communication system via the first communications network;
otherwise, if it is determined that the alert signal cannot be successfully sent from the user device to the emergency communication system via the first communications network, sending the alert signal to the emergency communication system via the second communications network, wherein the second communications network differs from the first communications network.

15. The method of claim 8, further comprising:
identifying a geographical location of the at least one responder; and
transmitting the geographical location of the at least one responder to the user device to enable the user device to display the geographical location of the at least one responder on a digital map.

16. The method of claim 8, wherein the geographical location of the user is determined by a dispatch center.

17. A non-transitory processor-readable medium having instructions stored thereon, which when executed by one or more processors, cause the one or more processors to implement a method for emergency communicating, the method comprising:
receiving, by at least one of at least two distributed servers, from a user device an alert signal initiated by a user during an emergency via a first communications network or a second communications network, wherein the user device is configured to perform detecting, by one or more sensors of the user device, the emergency in proximity to the user and sensing, by the one or more sensors of the user device, a health condition associated with the user, the alert signal including data related to the detecting and the sensing, wherein the data related to the sensing include at least vital parameters of the user, and wherein data concerning the alert signal, the users, and the emergencies is stored to each of the at least two distributed servers, wherein any piece of the data concerning the alert signals, the users, and the emergencies can be retrieved is retrievable from any of the at least two distributed servers;
determining, by at least one of the at least two distributed servers, a geographical location of the user based at least in part on the alert signal;

receiving, by at least one of the at least two distributed servers, an emergency type from the user device, the user device automatically identifying the emergency type associated with the user by processing the data related to the detecting, the vital parameters of the user, and information gained from third parties;

upon receiving the alert signal and determining the geographical location of the user, collecting, by the least one of the at least two distributed servers, data from one or more sensors located in proximity to the geographical location of the user, the one or more sensors located in proximity to the geographical location of the user including at least one or more cameras located in proximity of the geographical location of the user;

addressing, by at least one of the at least two distributed servers, the emergency of the user based at least on the emergency type, the geographical location of the user, and the data collected from the one or more sensors located in proximity of the geographical location of the user;

wherein one way to address the emergency in accordance with the emergency type and the geographical location includes selecting, by at least one of the at least two distributed servers, at least one responder to address the emergency based at least on the emergency type and the geographical location of the user, and sending an emergency signal to the at least one responder via a third communications network to report the emergency, the emergency signal including at least the geographical location of the user;

wherein another way to address the emergency in accordance with the emergency type and the geographical location includes sending, by at least one of the at least two distributed servers, a response to the user device, the response including information concerning necessary measures to be taken by the user during the emergency; and wherein yet another way to address the emergency in accordance with the emergency type and the geographical location includes establishing, by at least one of the at least two distributed servers, a two-way voice all between the user and the at least one responder.

* * * * *